US006762360B2

(12) United States Patent
Wright (10) Patent No.: US 6,762,360 B2
(45) Date of Patent: Jul. 13, 2004

(54) ENCLOSURE FOR TELECOMMUNICATIONS EQUIPMENT (75) Inventor: Colin Morgan Wright, Somerset (GB)

(73) Assignee: Cooper B-Line Limited, Somerset (GB)

( * ) Notice: Subject to any disclaimer, the term of this patent is extended or adjusted under 35 U.S.C. 154(b) by 0 days.

(21) Appl. No.: 10/361,773

(22) Filed: Feb. 11, 2003

(65) Prior Publication Data

US 2003/0111246 A1 Jun. 19, 2003

Related U.S. Application Data (63) Continuation of application No. 10/013,448, filed on Dec. 13, 2001, now abandoned, which is a continuation of application No. 09/380,639, filed on Oct. 8, 1999, now Pat. No. 6,348,655.

(30) Foreign Application Priority Data

Mar. 6, 1997 (GB) .............................................. 9704647

(51) Int. Cl.[7] .............................................. H01J 15/00
(52) U.S. Cl. .......................... 174/50; 174/58; 220/4.02; 29/729
(58) Field of Search .............................. 174/37, 38, 48, 174/50, 58; 220/3.6, 3.8, 4.02; 248/205.1; 29/729, 772

(56) References Cited

U.S. PATENT DOCUMENTS

| 3,265,419 | A | * | 8/1966 | Durnbavish et al. | ........ 403/219 |
| 4,430,835 | A | | 2/1984 | Ericson | |
| 4,462,193 | A | * | 7/1984 | Ericson | ........ 52/282 |
| 5,083,941 | A | | 1/1992 | Rodgers et al. | |
| 5,357,874 | A | * | 10/1994 | Palmer | ........ 108/50.02 |
| 5,364,178 | A | | 11/1994 | Hofman et al. | |
| 5,540,339 | A | | 7/1996 | Lerman | |
| 5,810,303 | A | | 9/1998 | Bourassa et al. | |
| 6,152,553 | A | | 11/2000 | Wunderlich | |
| 6,348,655 | B1 | * | 2/2002 | Wright | ........ 174/50 |
| 6,407,332 | B1 | * | 6/2002 | Buchberger et al. | ........ 174/50 |

FOREIGN PATENT DOCUMENTS

| EP | 0 101 885 A2 | 3/1984 |
| EP | 0 143 718 A2 | 6/1985 |
| EP | 0 762 586 A1 | 3/1997 |

(List continued on next page.)

OTHER PUBLICATIONS

Catalogue for Electronics Enclosures 96/97; pp. 13.00 ti 13.19; Aug. 1996.
Multi–Practice Racking System; Vero Electronic; pp. 1–7; 1997.
ETRAK; European Telecommunications Rack: Vero Elctronics; pp. 2–3 and 6–7; 1994 –No Date.
COMRACK; A revolutionary new cabinet concept; The Electronics Packaging Solution; Schroff U.K. Ltd.: (1994), No Date.
Cabinet Accessories; Swing Frames; pp. 2.44; BICC–VERO Electronics Ltd.; 1994, No Date.
LAN, The Network Solution, Knorr 3/92.
Weber & Heim, Letter dated May 8, 2001 re: 98 910 832.9/0965 254 and translation thereof.
Schroff Cabinets, Catalogue; pp. 13.00–13.19.

Primary Examiner—Dhiru R Patel
(74) Attorney, Agent, or Firm—Burns, Doane, Swecker & Mathis, L.L.P.

(57) ABSTRACT

An enclosure for housing connections of cables and connection equipment in a telecommunications or data communication network includes a skeleton frame structure (1, 2, 3, 4) and a plurality of panels (10, 11, 15, 16, 17). The frame structure includes upper (1) and lower (2) forwardly projecting frame portions. At least the upper frame portion (1) is arranged as a cantilever being supported at its rear end and extending forwardly to the front of the enclosure. At least some of the plurality of panels are at least partly releasable from the skeleton frame structure. The enclosure can be formed from a flat pack.

30 Claims, 11 Drawing Sheets

FOREIGN PATENT DOCUMENTS

| | | |
|---|---|---|
| GB | 527880 | 10/1940 |
| GB | 604344 | 7/1948 |
| GB | 737221 | 9/1955 |
| GB | 947445 | 1/1964 |
| GB | 1141431 | 1/1964 |
| GB | 1101356 | 1/1968 |
| GB | 1 267 705 | 3/1972 |
| GB | 1512899 | 6/1978 |
| GB | 1 602 191 | 11/1981 |
| GB | 2 282 527 A | 4/1995 |
| GB | 2 294 194 A | 4/1996 |

* cited by examiner

ENCLOSURE FOR TELECOMMUNICATIONS EQUIPMENT

This application is a continuation of U.S. application Ser. No. 10/013,448, filed on Dec. 13, 2001 now abandoned, which is a continuation of U.S. application No. 09/380,639, filed on Oct. 8, 1999 now U.S. Pat. No. 6,348,655, which was a national stage filing under 35 U.S.C. § 371 of International Application No. PCT/GB98/00671 filed on Mar. 6, 1998.

BACKGROUND AND SUMMARY OF THE INVENTION

The invention relates to an enclosure, in particular, but not exclusively, to an enclosure suitable for housing connections of cables and connection equipment in a telecommunications or data communications network. The invention also relates to a flat pack from which an enclosure can be formed, to an enclosure installation and to a method of connecting cables in an enclosure.

An enclosure is commonly provided in a communications network to house a multiplicity of cable connections. In order to protect the connections and also to protect persons from connections, the connections are surrounded by an enclosure. It is important that the enclosure is substantially closed on all sides in order to provide the desired degree of protection. On the other hand, the cables have to be connected in the enclosure and, in order to make efficient use of space, a high density of connections is desirable; consequently it is desirable for the enclosure to provide as little obstruction as possible to access for the purpose of making the connections or access for serviceability. Those two requirements have proved difficult to reconcile.

It is an object of the invention to provide an enclosure which, after connections have been made, can provide full protection to those connections, but which also is able to cause very little obstruction to access when connections are being made.

According to the invention there is provided an enclosure comprising a skeleton frame structure and a plurality of panels, wherein the frame structure includes upper and lower forwardly projecting frame portions, of which at least the upper frame portion is arranged as a cantilever being supported at its rear end and extending forwardly to the front of the enclosure, and at least some of the plurality of panels are at least partly releasable from the skeleton frame structure.

With the enclosure of the invention, it is possible to make the cable connections when only the skeleton frame structure is in place. Thereafter the panels can be attached to form a fully protected enclosure. Since at least the upper frame portion is arranged as a cantilever there may be no frame structure below the upper frame portion except at the back of the enclosure so that very open access to the enclosure is possible from all directions for making the cable connections.

Preferably the lower frame portion is also arranged as a cantilever being supported at its rear end and extending forwardly to the front of the enclosure. Such an arrangement improves accessibility when making cable connections.

Usually the enclosure of the invention will be arranged to be able to be mounted on an upright wall. It is also possible, however, for the enclosure to be free standing; in that case the lower frame portion although arranged in the manner of a cantilever may not actually act in that way because it may be supported over all of its underside.

Preferably the upper and lower forwardly projecting frame portions comprise respective upper and lower frame members. It is advantageous to make the upper and lower frame portions from separate members to reduce the space occupied by the dismantled frame. Also the same upper and lower frame portions can then be used for enclosures of different heights.

Preferably each of the upper and lower forwardly projecting frame portions includes a front, substantially horizontal portion and a pair of side, substantially horizontal portions extending rearwardly from opposite ends of the front portion to the rear of the enclosure. With such an arrangement the frame portions encroach very little on the interior space of the enclosure and pose very little obstruction to horizontal movement of any body through the enclosure.

Preferably each of the upper and lower forwardly projecting frame portions includes rear, substantially vertical portions, extending vertically from the rear ends of the side portions. Preferably the rear ends of the frame portions at one side of the enclosure are secured to a first, common, vertically extending member and the rear ends of the frame portions at the other side of the enclosure are secured to a second, common, vertically extending member. Preferably the frame portions are received in channels formed in the vertically extending members. With such an arrangement a strong and rigid connection can be made between the frame portions, the vertically extending members thereby producing a strong and rigid frame. Furthermore the height of the frame can be altered simply by altering the length of the vertically extending members. The vertically extending members may be formed of sheet metal pressed into the desired shape to form the channels.

Preferably the upper and lower forwardly projecting frame portions are formed of one or more tubular members. Tubular members are readily manufactured and can readily provide a strong and rigid structure.

Enclosures usually include a top panel, bottom panel, and a pair of side panels, and in many cases also a front panel.

Preferably, the enclosure of the invention includes a top panel which is detachably mounted over the upper frame portion; similarly, the enclosure preferably includes a bottom panel which is detachably mounted under the lower frame portion. The top and bottom panels are preferably secured to the upper and lower frame portions, respectively. The top and/or bottom panel may be provided with an openable part to allow cables to enter the enclosure.

Preferably the enclosure includes a front panel. pivotably mounted for pivoting about a vertical axis at a side of the enclosure.

Preferably the enclosure includes at least one side panel that is securable in a fixed position over a side of the enclosure but is partly releasable to provide a panel pivotable about a vertical axis at the rear of the enclosure. By pivoting the side panel outwardly about a vertical axis at the rear of the enclosure the side of the enclosure becomes highly accessible especially at the front. The at least one side panel is preferably fully detachable. With the side panel fully detached even more open access is provided. Preferably both of a pair of opposite side panels of the enclosure are as defined above.

The front panel and/or the side panels are preferably mounted on the top and bottom panels outside the skeleton frame structure. with the preferred disposition of the upper and lower frame portions the connections between the top and bottom panels and the other panels they mount are close to the frame portion and therefore the top and bottom panels do not themselves require great strength in order to provide a satisfactory mounting of the other panels.

For some applications it is preferable that the enclosure further includes a swing frame mounted on the skeleton frame for pivoting movement about a substantially vertical axis disposed at a side of the enclosure. Such a moving frame can be accommodated entirely within the rest of the enclosure after connections have been made but can be swung out of the enclosure through an angle which may be at least 180° to allow excellent access to the swing frame and to any region of the enclosure behind the swing frame.

Preferably the substantially vertical axis of pivoting of the swing frame is disposed approximately midway between the front and the back of the enclosure. In such a case, swinging the swing frame through 180° can usually be accommodated and in the position where the swing frame is swung out through 180° it will not project forwardly any further from the vertical plane containing the rear of the skeleton frame, than the remaining part of the enclosure; that is advantageous, for example, if work has to be carried out on the enclosure when it is mounted in a narrow corridor.

The swing frame preferably comprises a first side portion extending forwardly from the substantially vertical axis of pivoting, a second front portion adjacent to the front of the enclosure and, preferably, also a third side portion extending rearwardly from the front portion on the opposite side of the enclosure to the substantially vertical axis of pivoting, the locations as viewed in plan of the frame portions referred to being ones that are adopted when the swing frame is in its stored position within the remainder of the enclosure.

Preferably the bottom of the swing frame is above the lower frame portion and the top of the swing frame is below the upper frame portion. The swing frame preferably includes an upper frame portion underlying the upper frame portion of the skeleton frame and a lower frame portion overlying the lower frame portion of the skeleton frame. The swing frame is preferably formed of one or more tubular members. In such a case the presence of the swing frame can be arranged to have very little effect on the space available for connections within the enclosure and on the ease of accessibility to all regions of the enclosure. Furthermore, in the case where the swing frame has a third side portion extending rearwardly from the front portion of the frame on the opposite side of the enclosure to the substantially vertical axis of pivoting of the swing frame, the third side portion may extend rearwardly of the axis of pivoting adjacent to the side of the enclosure. The third side portion can still be able to be swung out even though it has to pass through the side of the remainder of the enclosure because the side panel can be at least partly releasable to allow such movement.

The enclosure may be referred to as a cabinet and may be used for any suitable purpose but is especially designed for use in a telecommunications or data communications network. The enclosure may therefore be referred to as an electrical equipment cabinet. In an enclosure for use in a telecommunications or data communications network it is conventional to provide vertically extending mounting angles suitable for mounting cable equipment, for example, cable blocks or the like to which ends of cables are connected and suitable for mounting shelves on which telecommunications or data communications equipment, for example, modems, can be placed. The enclosure of the invention may accordingly further include a pair of vertically extending mounting angles fixed to the upper and lower frame portions. The mounting angles may be suitable for mounting cable blocks or the like. The mounting angles may be designed according to any required standard such as a telecommunications standard; for example they may be IEC 297-1 mounting angles or ETSI 300-119 Part 3 mounting angles or mounting angles according to any other telecommunications standard.

Although the form of frame structure defined above is regarded as highly desirable, it is within the scope of the invention to adopt somewhat different frame structures. Accordingly, the invention also provides an enclosure comprising a skeleton frame structure and a plurality of panels at least some of which are at least partly detachable from the frame structure. Away from its rear, the enclosure is preferably free of any frame structure extending a substantial distance vertically; if the enclosure is not entirely free of such a vertically extending frame structure then that frame structure is preferably confined to one side so that in the middle and on the other side of the frame structure the enclosure is unobstructed by such vertically extending members. Such an arrangement is especially advantageous in allowing the swing frame referred to above to be used to its maximum advantage. The enclosure may include any of the features referred to in the paragraphs above.

An advantageous feature of the enclosure of the present invention is that it can be supplied as a kit comprising a plurality of separate members which can be packed substantially flat. Accordingly the invention further provides a flat pack including frame members and panels for assembling on site into an enclosure as defined above.

The invention further provides an enclosure installation including an enclosure as defined above and a multiplicity of cables entering the enclosure in the region of the rear thereof. The installation may further include cable connecting equipment fixed to the frame structure.

The invention further provides a telecommunications or data communications network including an enclosure installation as defined above.

The invention still further provides a method of connecting cables in an enclosure, the method including the following steps:

locating a skeleton frame structure of the enclosure in its required position, connecting ends of cables within the enclosure, and securing side and front panels to the frame structure in a closed condition to form, together with top and bottom panels that are fitted during the method, an enclosure in which cables are connected.

The frame structure may be located before the cables are connected, but it is also possible to make the cable connections first and then locate the enclosure over the connections. Since the cables are connected before the side and front panels are secured in a closed condition, and can also be connected before the top and bottom panels are fitted, the process of connecting the cables can be virtually unhindered by the enclosure. Preferably the top and bottom panels are fitted before the side and front panels and serve to mount the side and front panels. The enclosure may be supplied as a flat pack and the skeleton frame assembled from parts of the flat pack. The enclosure may be in any of the forms defined above.

BRIEF DESCRIPTION OF THE DRAWINGS

By way of example certain embodiments of the invention will now be described with reference to the accompanying drawings, of which.

DETAILED DESCRIPTION OF THE INVENTION

Figure 1:
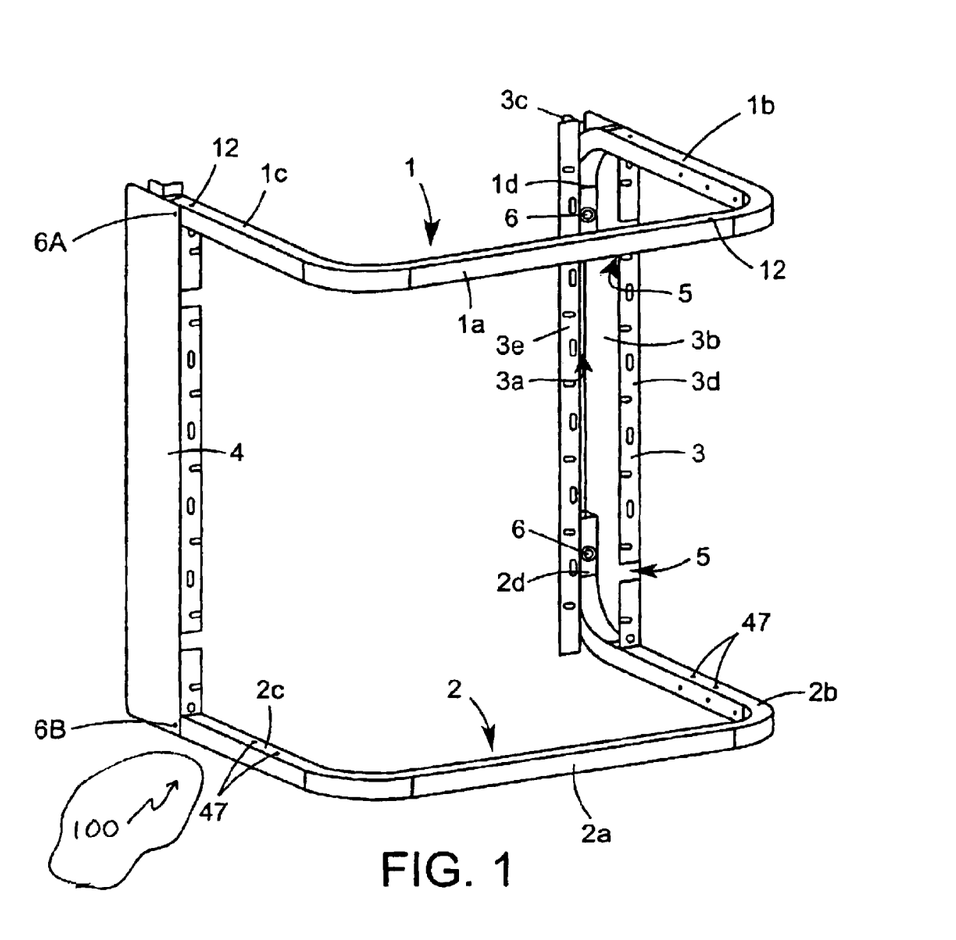
FIG. 1 is a perspective view of a skeleton frame of an enclosure.

It is convenient to describe the enclosure by describing the sequence of steps by which it is assembled. FIG. 1 shows the first stage of assembly in which a skeleton frame structure 100 has been created, the structure including an upper forwardly projecting frame part 1, a lower forwardly projecting front part 2, a first vertically extending member 3 and a second vertically extending member 4. The upper forwardly projecting frame part 1 comprises a single tubular member of square cross-section bent to form a front, horizontal, portion 1a, a pair of side, horizontal portions 1b and 1c extending rearwardly from opposite ends of the front portion 1a and a pair of rear, vertical portions 1d and 1e extending downwardly from the rear ends of the side portions b and 1c respectively. The lower forwardly projecting frame part 2 similarly comprises a single tubular member of square cross-section bent to form a front, horizontal, portion 2a, a pair of side, horizontal, portions 2b and a pair of rear, vertical, portions 2d and 2e extending upwardly from the rear ends of the side portions 2b and 2c respectively. Because the frame parts 1 and 2 are formed by bending, there are curved bends at the junctions of each of the portions 1a to 1e and at the junctions of each of the portions 2a to 2e.

Each of the vertically extending members 3, 4 is formed from sheet metal pressed into a desired configuration. The members are mirror images of one another and the member 3 will be described below. The member 3 is generally of channel section having a channel 3a of a width just sufficient to receive the vertical portions 1d and 2d of the frame parts 1 and 2. An outer wall 3b defining the channel is deeper than an inner wall 3c and both of the walls terminate in flanges 3d and 3e respectively which both project inwardly into the enclosure. The flange 3d is cut away at its top and bottom extremity to allow the passage of the side portions 1b and 2b of the upper and lower parts and is also cut away in two other places indicated by reference numeral 5 to allow access for a fastening tool when the enclosure is mounted on a wall by means of suitable fasteners (not shown) which are passed through holes 6 in the rear portions 1d and 2d of the upper and lower frame parts and through aligned holes (not visible in FIG. 1) in the base of channel 3a. It will be understood that the member 4 is arranged in substantially the same way in relation to the end portions 1e and 2e and the side portions 1c and 2c of the upper and lower frame parts.

Once the upper and lower frame parts 1, 2 are rigidly secured to the vertically extending members 3, 4, for example, by fasteners passing through holes 6A, 6B in the members 3, 4 and engaging in the rear portions 1d, 1e and 2d, 2e, a rigid frame is formed with both the upper and lower frame parts arranged as cantilevers, being supported at their rear ends in the vertically extending members 3, 4.

Figure 2:
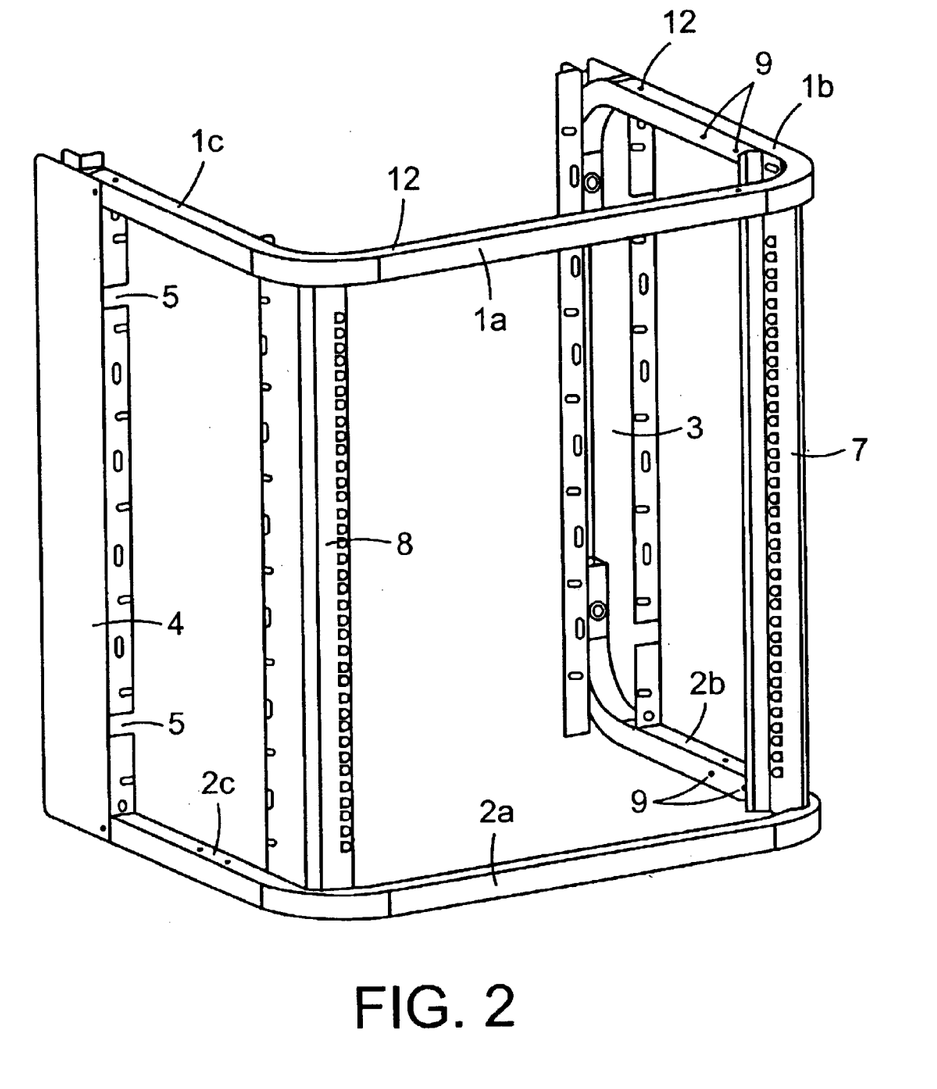
FIG. 2 is a perspective view of the assembly of FIG. 1 with a pair of mounting angles added.

Referring now to FIG. 2, a pair of mounting angles 7 and 8 are then fixed to the skeleton frame by screw threaded fasteners passing through slots in the ends of the mounting angles 7, 8 and engaging in selected ones of series of holes 9 formed in the inner side faces of the side portions 1b, 1c and 2b, 2c. In the particular example shown the mounting angles are IEC 297-1 mounting angles.

Once the assembly stage of FIG. 2 has been reached, it is possible to mount cable blocks or the like on the mounting angles and to connect ends of cables as desired, the cables entering the enclosure from above or below at the rear. It may be noted that the cables may be disposed vertically up or down the wall behind the enclosure before the skeleton frame is secured to the wall without impeding the securing of the frame.

Figure 3:
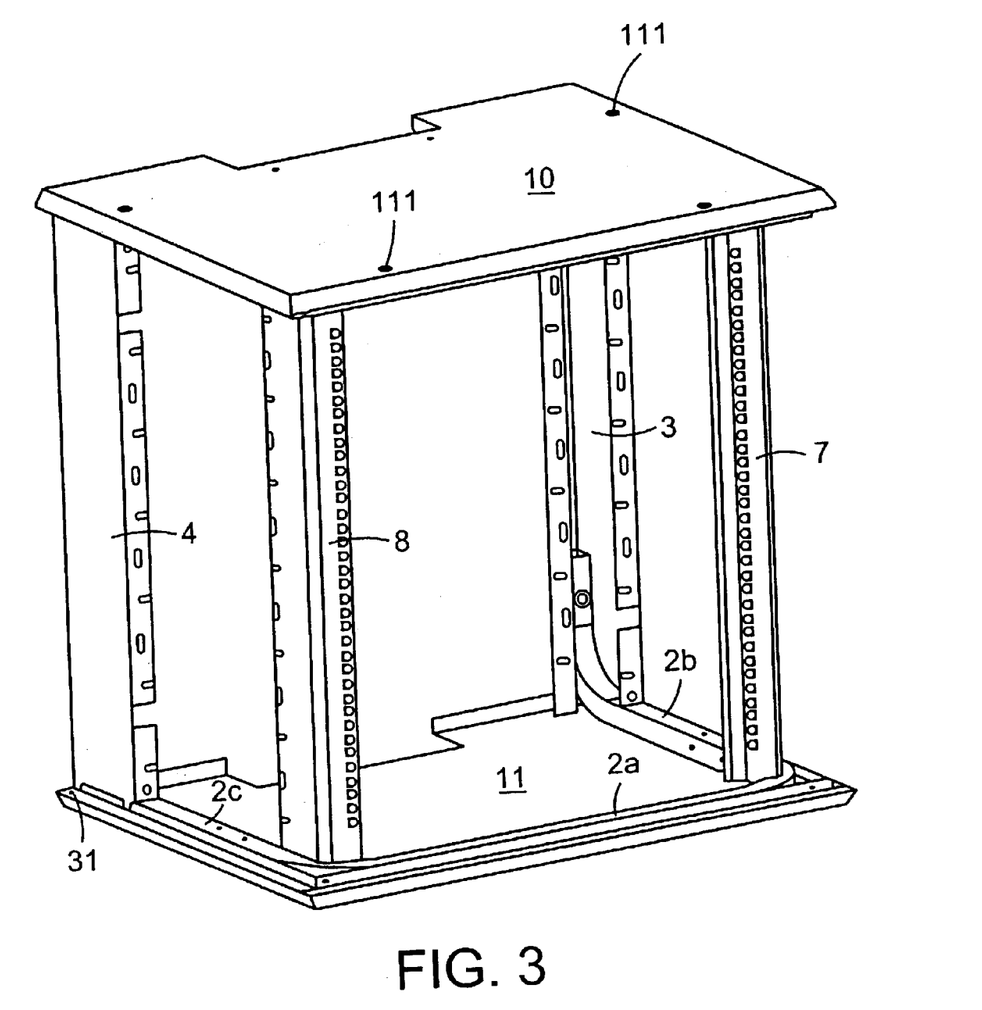
FIG. 3 is a perspective view of the assembly of FIG. 2 with top and bottom panels added.

FIG. 3 shows a top panel 10 and a bottom panel 11 added to the skeleton frame. The top panel 10 is placed over the upper frame part 1 and secured thereto by fasteners 111 screwed into holes 12 formed in the top faces of the side portions 1b, 1c and the front portion 1a. Similarly the bottom panel 11 is placed under the lower frame part 2 and secured thereto by fasteners (not visible) screwed into holes (not visible) formed in the bottom faces of the side portions 2b, 2c and the front portions 2a. As can be seen in FIG. 3 the top and bottom panels 10 and 11 are rectangular and project outwardly a small amount beyond the upper and lower frame parts 1 and 2.

Figure 4:
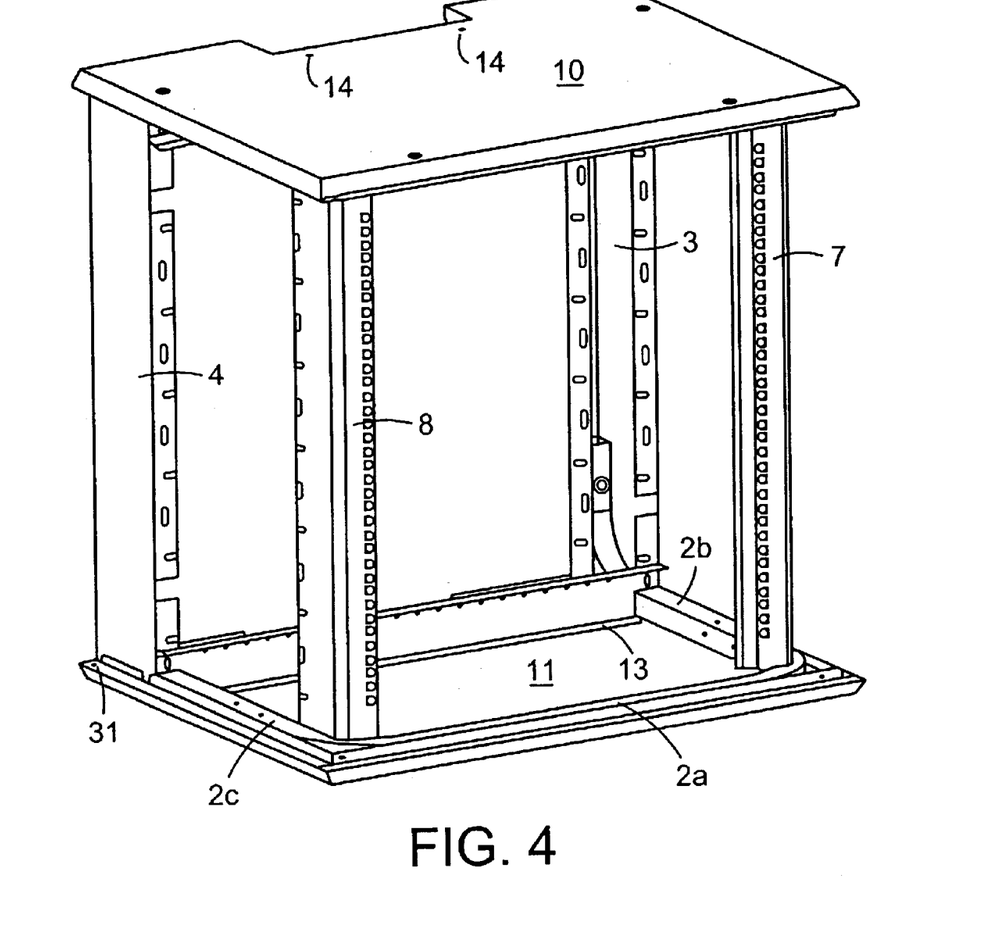
FIG. 4 is a perspective view of the assembly of FIG. 3 with cross-frame members added.

As shown in FIG. 4, cross-frame members 13 are next secured over the top of the bottom panel 11 between the side portions 2b, 2c of the lower frame part and under the bottom of the top panel 10 between the side portions 1b, 1c of the upper frame part towards the rear of the enclosure; each cross-member 13 is secured by screw fasteners passing through holes 14 in the top and bottom panels. It should be understood that only the lower cross-frame member 13 is visible in the drawings but an upper cross-frame member 13 is located in a similar manner to the lower one at the top of the enclosure.

Figure 5:
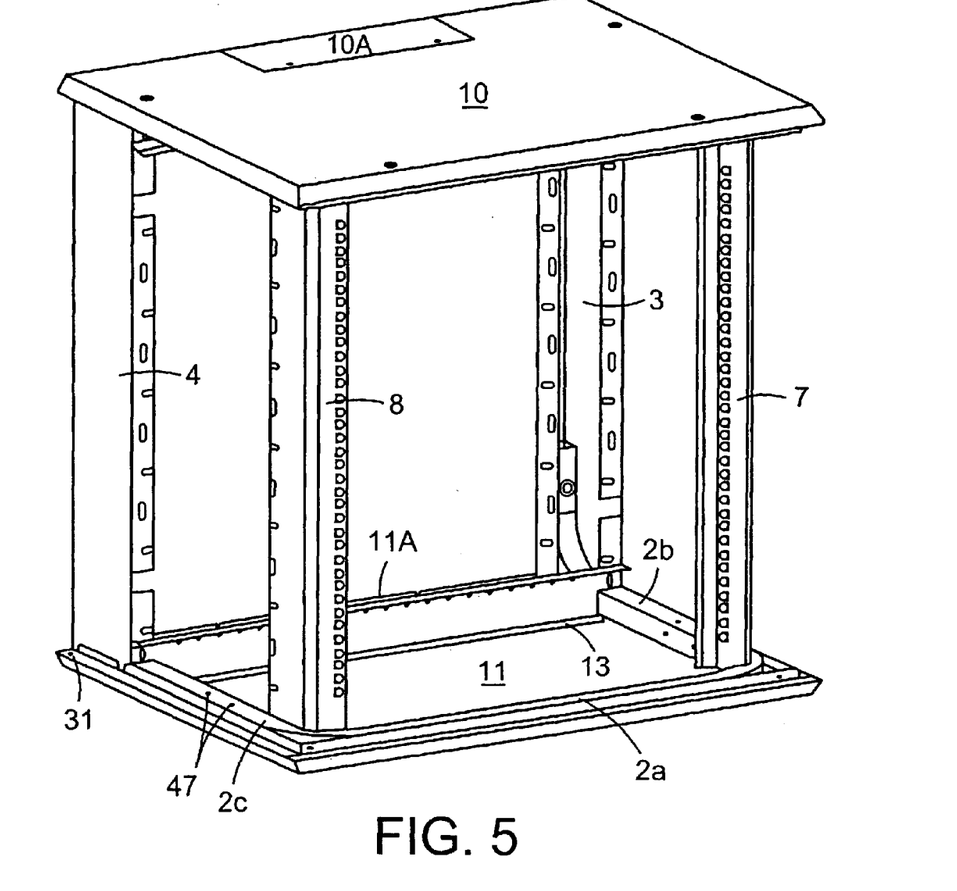
FIG. 5 is a perspective view of the assembly of FIG. 4 with final parts added to the top and bottom panels.

As can be seen in FIG. 4, both the top and bottom panels 10 and 11 are provided with cut outs at the back to aid the passage of cables into the enclosure. Each panel does, however, include a final closure part 10A, 11A which can be used to close the cut out regions of the panels if the space is not required for cables or mechanical relief. The closure parts 10A, 11A are secured by fasteners passing through the parts 10A, 11A and secured to the cross members 13. In FIG. 5 the panels 10 and 11 are both shown with their closure parts 10A, 11A fitted but it will be understood that, if desired, only one or neither of the parts may be fitted.

Figure 6:
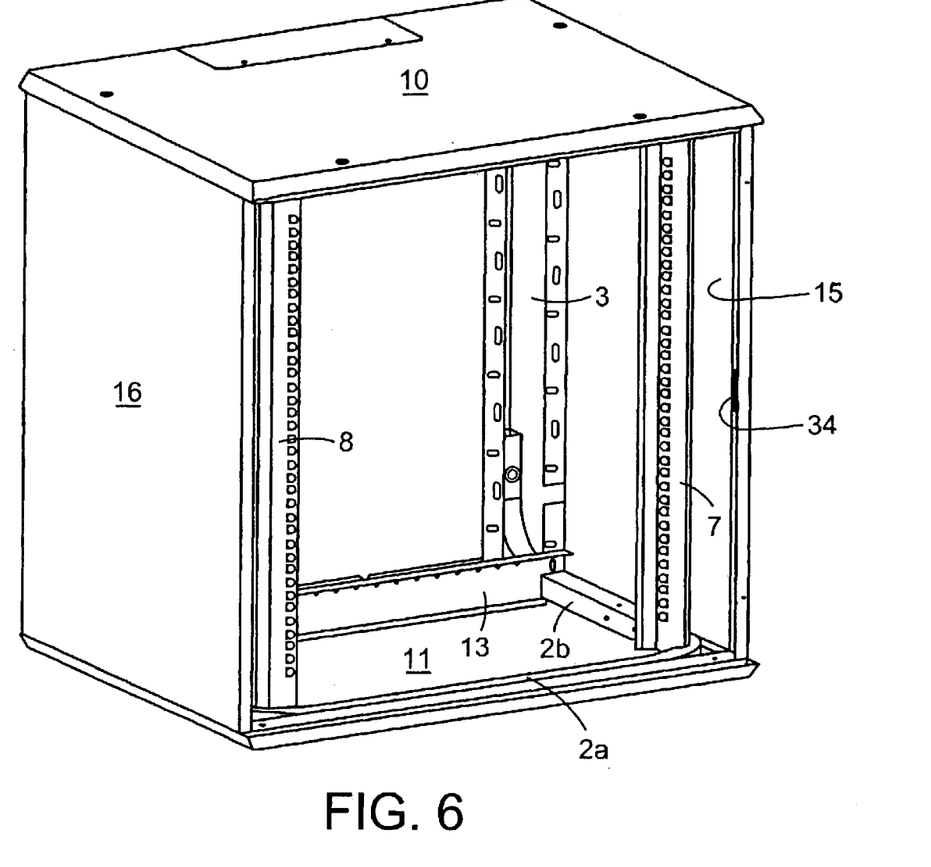
FIG. 6 is a perspective view of the assembly of FIG. 5 with side panels added.
Figure 7:
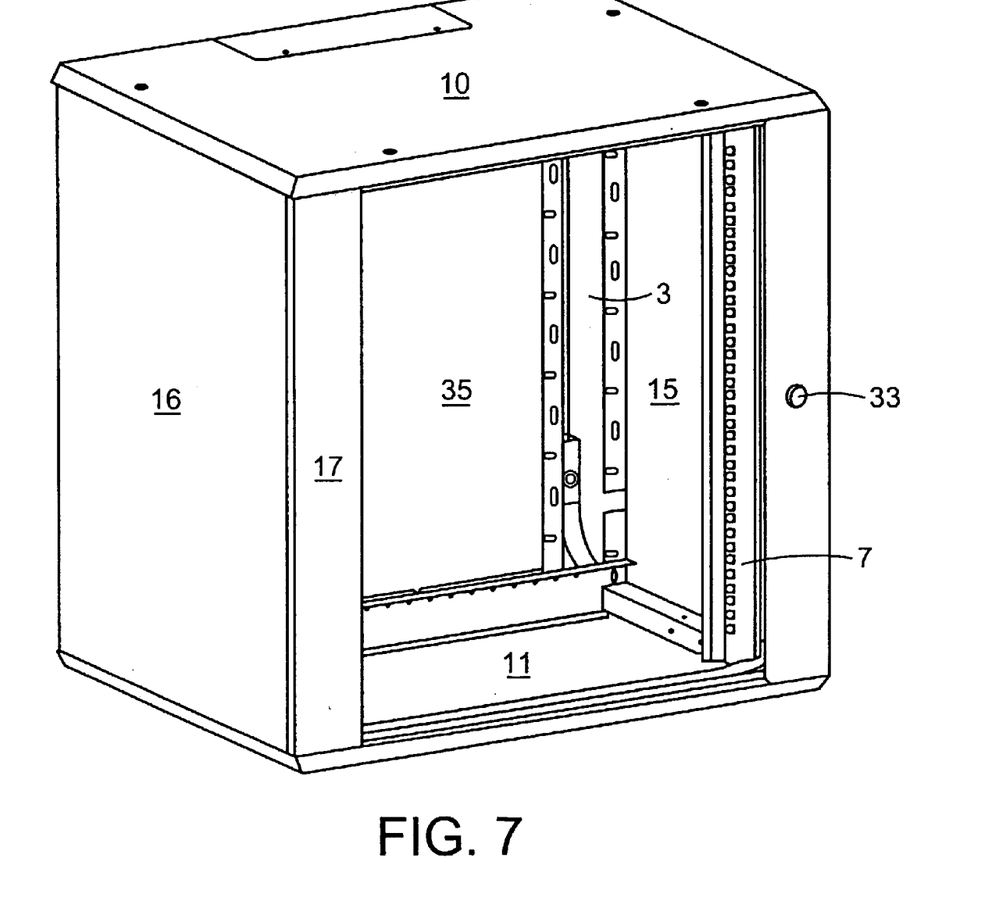
FIG. 7 is a perspective view of the assembly of FIG. 6 with a front panel added, the assembly defining a complete enclosure.
Figure 8A:
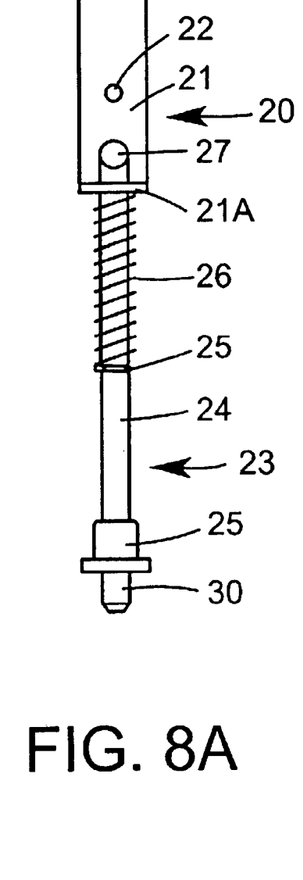
FIGS. 8A and 8B are front and side views of a hinge fastener employed in the assembly steps illustrated in FIGS. 6 and 7.
Figure 8B:
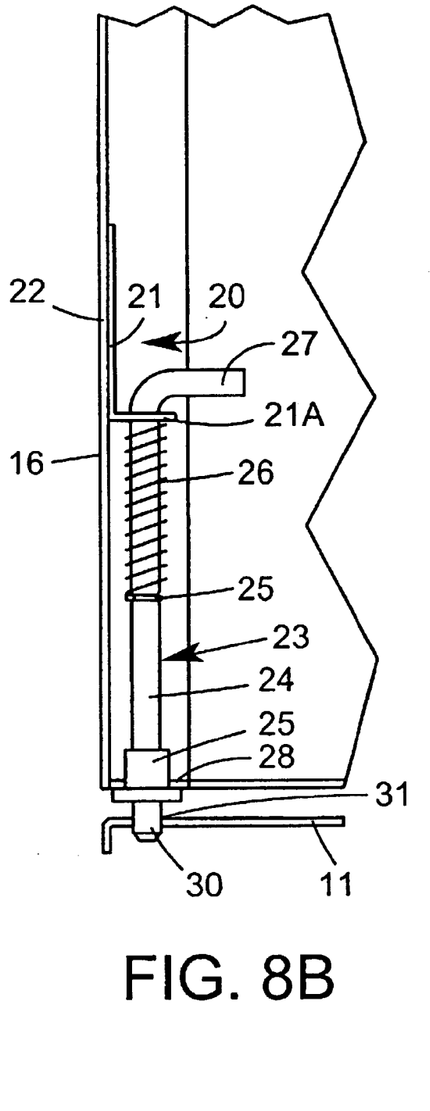

The next step in assembly is to fix side panels 15 and 16 as shown in FIG. 6 and then to fit a front panel 17 as shown in FIG. 7. The side panels 15, 16 and the front panel 17 are held in position by resiliently biased pins which are mounted in those panels but are biased into engagement in holes provided in the top and bottom panels, as will now be described more fully with reference also to FIGS. 8A and 8B. Each side panel 15, 16 is made of sheet steel and has an inwardly directed flange around its periphery. A pin assembly of the kind shown in FIGS. 8A and 8B is provided at each corner of the side panels 15, 16. As shown in FIGS. 8A and 8B, the pin assembly comprises an L-shaped bracket 20 comprising a longer arm 21 with fastening holes 22 by which the arm 21 may be secured flat against a part of a panel, for example by rivets, and a shorter arm 21A having a central aperture in which an "L" shaped pin 23 is mounted. The pin 23 has a shorter part 27 and a longer part 24. Partway along the length of the part 24 a circlip 25 is axially located and a compression spring 26 is provided on the part 24 between the circlip 25 and the bracket arm 21A thereby resiliently biasing the pin in a downward direction as viewed in FIGS. 8A and 8B. The shorter part 27 limits the downward movement of the pin by virtue of its engagement with the bracket arm 21A and also provides a convenient projection by which a person can raise the pin against the resilient bias of the spring 26.

In FIG. 8B a part of the bottom panel 11 and a lower rear portion of the side panel 16 is shown, the bottom flange of the side panel 16 being indicated by reference numeral 28 and the vertical face of the panel 16 being indicated by reference numeral 29. A plastic bush 25 is press fitted into the flange 28 of the side panel 16 and provides a slide mounting for the distal end 30 of the pin. The bottom panel 11 has an opening 31 (also marked in FIGS. 3 to 5) which, when the side panel 16 is correctly positioned, is aligned with the end 30 of the pin and into which the pin is biased by the spring 26. Thus it will be seen that the pin connection between the panels 11 and 16 shown in FIG. 8B can easily be made or unmade by a person raising the pin against the bias of the spring 26 and then releasing it.

Whilst FIG. 8B shown the pin arrangement at one corner of the side panel 16, it should be understood that similar arrangements are provided at the other corners of the panel 16 and at the four corners of the side panel 15. Also, a similar arrangement is provided at the top and bottom of the left hand side only (as seen in FIG. 7) of the front panel 17. The pins mounting the front panel 17 therefore act as a hinge for the front panel 17 and that panel is provided with a rotatable latch 33 which is releasably engageable in a slot 34 in the side panel 15 (FIG. 6) to hold the panel in a closed condition. The panel 17 shown in FIG. 7 has a clear transparent part 35 to allow visual inspection of the enclosure without opening the panel 17.

When the side panels 15, 16 are fully secured all four pins on each panel are engaged in corresponding openings in the top and bottom panels, but if the two pins at the front of a side panel are not engaged the panel is then free to pivot about the pins at the back of the side panel in a similar manner to the front panel 17. Such a partly detached arrangement of a side panel allows the side panel to be pivoted outwardly through at least 90° to allow clear access to the sides of the enclosure without having to detach the panel completely.

The completed enclosure will typically have a width in the range of 600 to 850 mm, a depth in the range of 250 to 600 mm and a height in the range of 370 to 1040 mm.

Whilst one particular form of enclosure has been described above, there are of course many modifications that can be made to the design and which may improve the design for particular applications.

Figure 9:
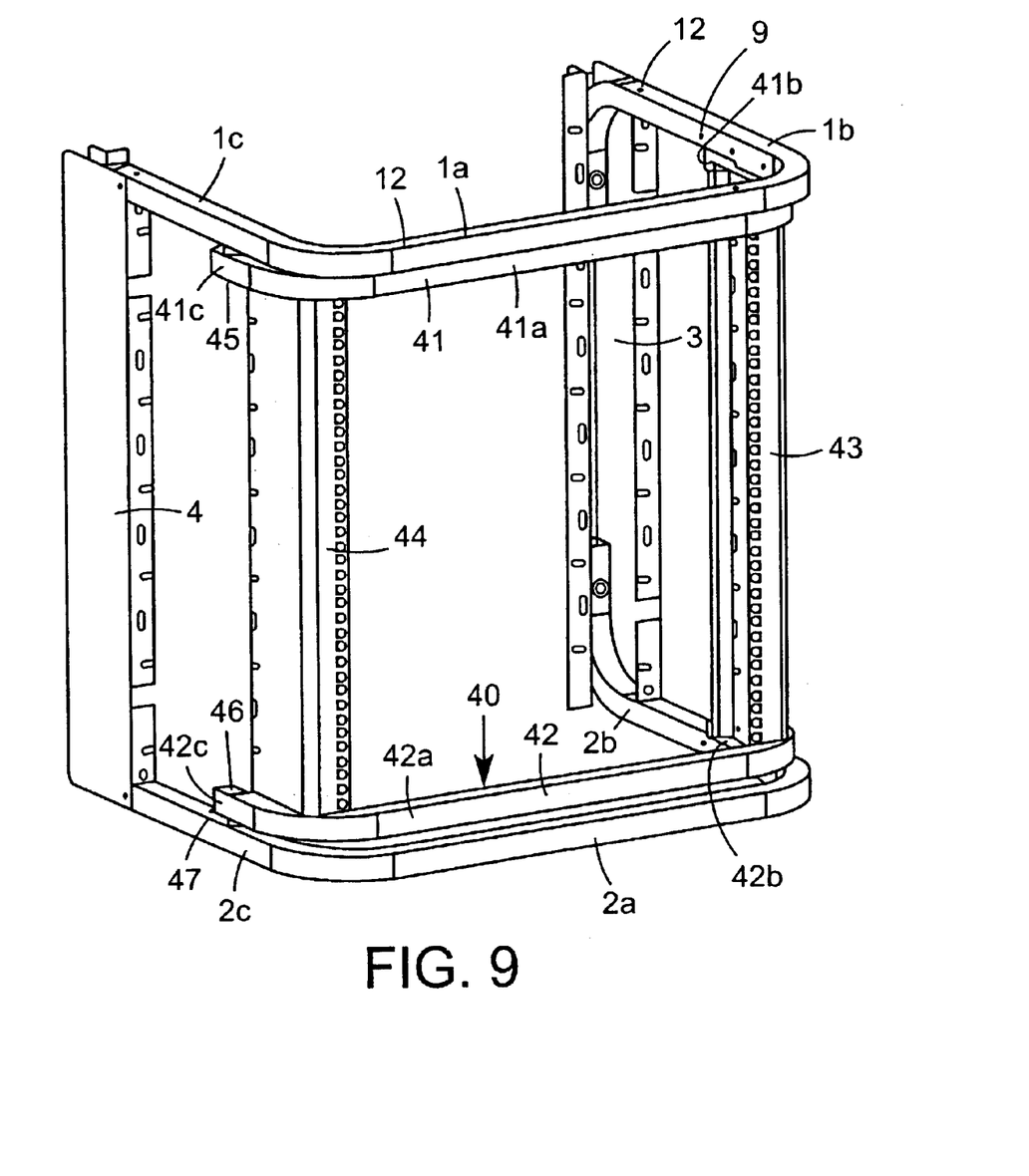
FIG. 9 is a perspective view similar to FIG. 2 but showing an assembly incorporating a swing frame.

One significant modification is that shown in FIG. 9, in which a swing frame 40 is mounted on the skeleton frame of the enclosure. The swing frame 40 generally comprises an upper frame member 41, a lower frame member 42 and a pair of vertical mounting angles 43, 44. The frame members 41, 42 each have a front portion 41a and 42a and a pair of side portions 41b, 41c and 42b, 42c extending rearwardly from opposite ends of the front portion. The frame member 42 is positioned immediately above the lower forwardly projecting frame part 2 and the frame member 41 is positioned immediately below the upper forwardly projecting frame part 1.

The mounting angles 43, 44 which in this embodiment are equivalent to the mounting angles 7 and 8 of FIG. 2 extend between the frame members 41, 42 and are rigidly fixed thereto by, for example, screw threaded fasteners.

The side portions 41c and 42c of the frame members 41, 42 are pivotally mounted on the side portions 1c and 2c of the frame parts 1 and 2 by shafts 45, 46 secured in selected ones of holes 47 provided in the top face of the side portion 2c and the bottom face (not visible in FIG. 9) of the side portion 1c. As will be appreciated by mounting the swing frame in more rearward ones of the holes 47, the position of the swing frame can be moved rearwardly.

By virtue of its mounting, the swing frame can be pivoted, from the position shown in FIG. 9, through an angle of at least 180° to provide unimpeded access to the rear of any components fixed on the swing frame. It should be noted that even if the lengths of the side portions 41b and 42b of the frame members 41 and 42 are increased so that those frame members extend further towards the rear of the enclosure, pivotal movement of the swing frame will not be obstructed, provided that the side panel 15 is not fixed in position, or is only fixed at the back and is pivoted into an open position.

When the swing frame is pivoted through 180°, it will project forwardly from the vertical wall on which the enclosure is mounted, less far than the skeleton frame structure, thus not creating any obstruction.

Figure 10:
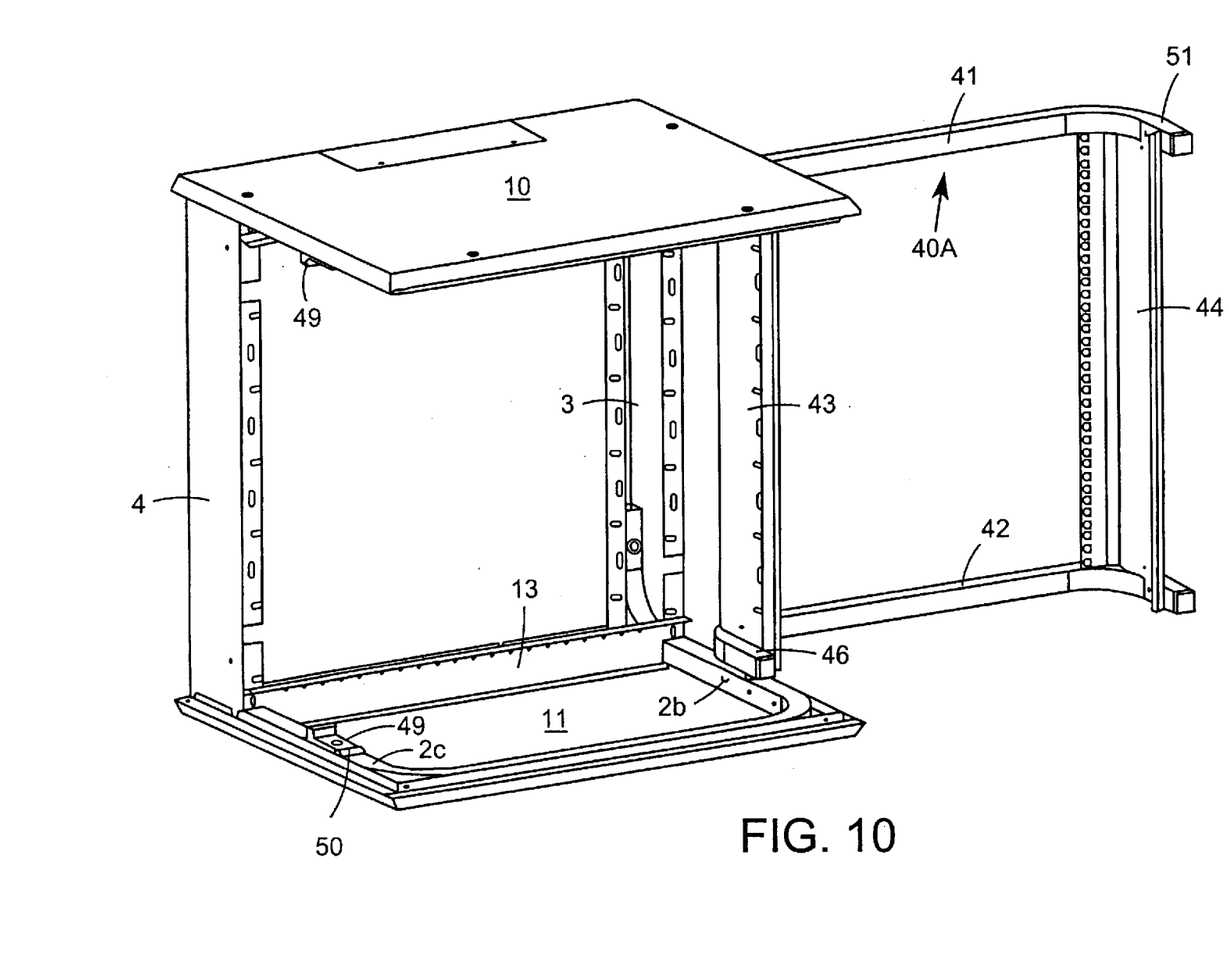
FIG. 10 is a perspective view of a partly assembled enclosure incorporating a swing frame in a similar, but different, way to FIG. 9.

FIG. 10 illustrates another form of enclosure incorporating a swing frame. In this case, the swing frame 40A is shown in its open position and it will also be seen that the swing frame is pivotally connected to the side portions 1b and 2b of the frame parts 1 and 2. Also catches 49 are fixed on the side portions 1c and 2c of the frame parts 1 and 2 (the frame part 1 is not visible in FIG. 10) and are formed with grooves 50 on their inner faces, the grooves 50 being arranged to accommodate rounded projections 51 on the outer faces of the distal ends of the frame members 41 and 42 (only the rounded portion 51 on the top of the upper face of the frame member 41 is visible in FIG. 10) It will be understood that as the swing frame is pivoted into the closed position the rounded projections 51 ride up over the leading edges of the catches 49 and then fall back into the grooves 50 resiliently holding the swing frame in a closed position.

Apart from the details described above and that in FIG. 10 the top and bottom panels 10 and 11 are shown already attached, it will be understood that the arrangement of the swing frame is generally the same as in FIG. 9 and the same reference numerals are used to designate corresponding parts. It should also be understood that the features of providing catch arrangements and mounting the swing frame for pivoting movement on the opposite side of the frame are entirely independent of one another and can therefore be used alone or together.

Figure 11:
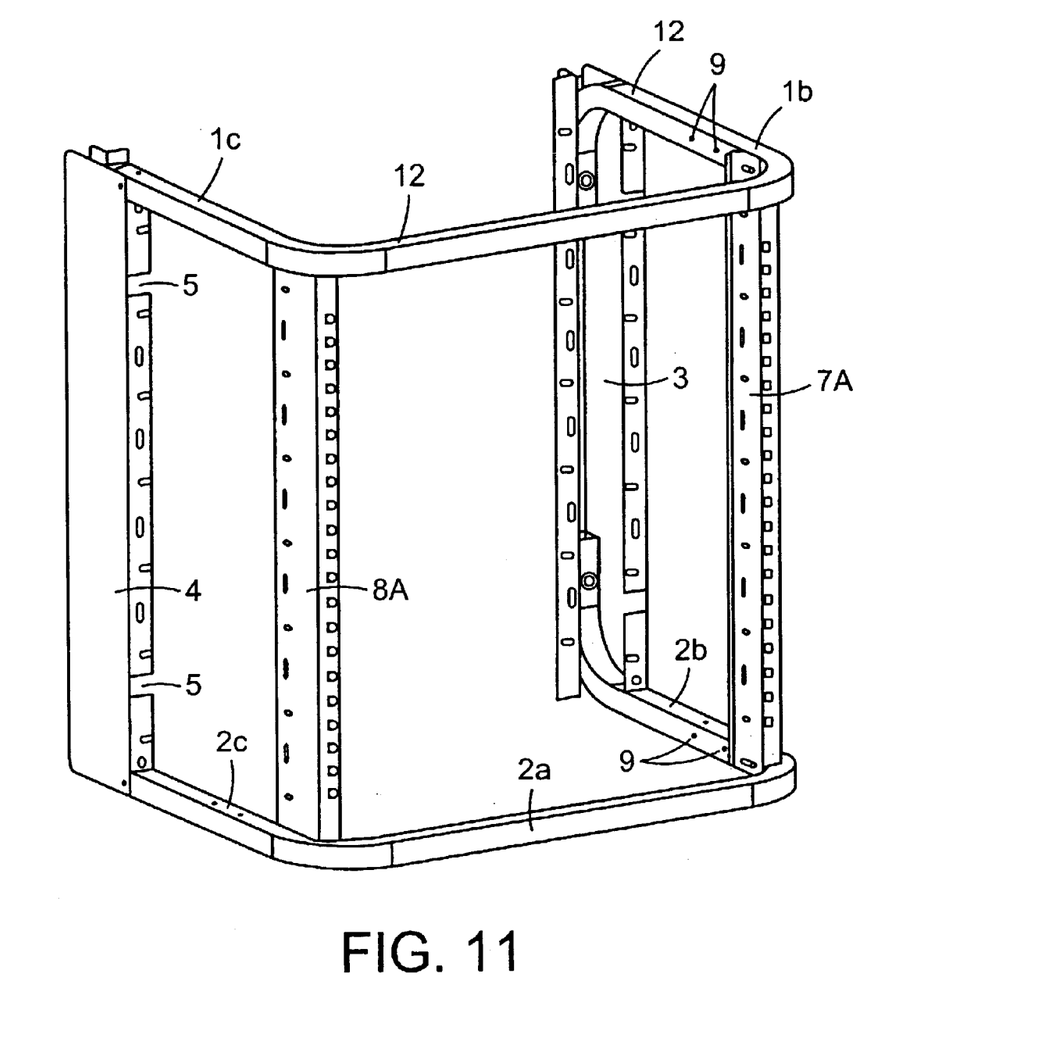
FIG. 11 is a perspective view similar to FIG. 2 but showing an alternative pair of mounting angles.

FIG. 11 shows another, minor, modification that can be made and shows different mounting angles 7A and 8A. In this particular example the mounting angles are ETSI 300-119 Part 3 mounting angles.

Whilst in the illustrated embodiments the panels are shown without ventilation openings, it is of course possible to provide such openings, if desired. Also, whilst the front panel 17 is shown with a transparent part 35. it is of course possible for the whole of the panel to be formed of sheet metal.

It will be appreciated from the description above that with the exception of the upper and lower forwardly projecting frame parts 1 and 2, all the components of the enclosure can be stored flat when dissembled. The vertical extent of the frame parts 1 and 2 is limited to the length of the portions 1d, 1e and 2d, 2e and is therefore not great. Accordingly the enclosure can be provided as a flat pack, if desired.

What is claimed is:

1. An enclosure comprising a skeleton frame structure and a plurality of panels, wherein the frame structure includes upper and lower forwardly projecting frame portions, of which at least the upper frame portion is arranged as a cantilever being supported at its rear end and extending forwardly to the front of the enclosure, and at least some of the plurality of panels are at least partly releasable from the skeleton frame structure.

2. An enclosure according to claim 1, in which the lower frame portion is also arranged as another cantilever being supported at its rear end and extending forwardly to the front of the enclosure.

3. An enclosure according to claim 1, said enclosure to be mounted on an upright wall.

4. An enclosure according to claim 1, in which the upper and lower forwardly projecting frame portions comprise respective upper and lower frame members.

5. An enclosure according to claim 1, in which each of the upper and lower forwardly projecting frame portions includes a front, substantially horizontal portion and a pair of side, substantially horizontal portions extending rearwardly from opposite ends of the front portion to the rear of the enclosure.

6. An enclosure according to claim 5, in which each of the upper and lower forwardly projecting frame portions includes rear, substantially vertical portions, extending vertically from rear ends of the side portions.

7. An enclosure according to claim 5, in which rear ends of the frame portions at one side of the enclosure are secured to a first, common, vertically extending member and the rear ends of the frame portions at the other side of the enclosure are secured to a second, common, vertically extending member.

8. An enclosure according to claim 7, in which the frame portions are received in channels formed in the vertically extending member.

9. An enclosure according to claim 1, in which the upper and lower forwardly projecting frame portions are formed of one or more tubular members.

10. An enclosure according to claim 1, wherein a top one of the plurality of panels is detachably mounted over the upper frame portion.

11. An enclosure according to claim 1, wherein a bottom one of the plurality of panels is detachably mounted under the lower frame portion.

12. An enclosure according to claim 1, in which top and bottom ones of the plurality of panels are secured to the upper and lower frame portions, respectively.

13. An enclosure according to claim 1, wherein a front one of the plurality of panels is pivotably mounted for pivoting about a vertical axis at a side of the enclosure.

14. An enclosure according to claim 1, wherein at least one side panel of the plurality of panels is securable in a fixed position over a side of the enclosure but is partly releasable to provide a panel pivotable about a vertical axis at the rear of the enclosure.

15. An enclosure according to claim 14, in which the at least one side panel is fully detachable.

16. An enclosure according to claim 14, in which the at least one side panel is both of a pair of opposite side panels of the enclosure.

17. An enclosure according to claim 1, further including a swing frame mounted on the skeleton frame for pivoting movement about a substantially vertical axis disposed at a side of the enclosure.

18. An enclosure according to claim 17, in which the substantially vertical axis of pivoting of the swing frame is disposed approximately midway between the front and the back of the enclosure.

19. An enclosure according to claim 17, in which the swing frame comprises a first side portion extending forwardly from the substantially vertical axis of pivoting, a second front portion adjacent to the front of the enclosure and, preferably, a third side portion extending rearwardly from the front portion on the opposite side of the enclosure to the substantially vertical axis of pivoting, the locations as viewed in plan of the frame portions referred to being ones that are adopted when the swing frame is in its stored position within the remainder of the enclosure.

20. An enclosure according to claim 17, in which the bottom of the swing frame is above the lower frame portion and the top of the swing frame is below the upper frame portion.

21. An enclosure according to claim 1, further including a pair of vertically extending mounting angles fixed to the upper and lower frame portions.

22. An enclosure installation including an enclosure according to claim 1 and a multiplicity of cables entering the enclosure in the region of the rear thereof.

23. An enclosure installation according to claim 22, further including cable connecting equipment fixed to the frame structure.

24. An enclosure installation according to claim 22, in which the enclosure is mounted on an upright wall.

25. A telecommunications or data communications network including an enclosure installation according to claim 22.

26. A method of connecting cables in an enclosure, the method including the following steps:
  locating a skeleton frame structure of the enclosure in its required position,
  connecting ends of cables within the enclosure,
  securing side and front panels to the frame structure in a closed condition to form, together with top and bottom panels that are fitted during the method, an enclosure in which cables are connected.

27. A method according to claim 26, in which the enclosure is supplied as a flat pack and the skeleton frame assembled from parts of the flat pack.

28. A method according to claim 26, in which the enclosure is according to claim 1.

29. An enclosure for use in a telecommunications or data communications network, the enclosure being arranged to be mounted on an upright wall and comprising a skeleton frame structure, a pair of vertically extending mounting angles to which cable connecting equipment can be fixed, and a plurality of panels secured on the skeleton frame structure, wherein the frame structure includes upper and lower forwardly projecting frame parts, each of the upper and lower forwardly projecting frame parts arranged as a cantilever being supported at its rear end and extending forwardly to the front of the enclosure, the mounting angles being fixed to the upper and lower forwardly projecting frame parts and the plurality of panels including top and bottom panels and side panels, which side panels are at least partly releasable.

30. An enclosure suitable for housing connections of cables and connection equipment in a telecommunications or data communications network, the enclosure being arranged to be mounted on an upright wall and comprising a skeleton frame structure, a pair of vertically extending mounting angles to which cable connecting equipment can be fixed, and a plurality of panels secured on the skeleton frame structure, wherein the frame structure includes upper and lower forwardly projecting frame parts, each frame part extending forwardly to the front of the enclosure, and wherein, away from its rear, the enclosure is free of any frame structure extending a substantial distance vertically, the mounting angles being fixed to the upper and lower forwardly projecting frame parts and the plurality of panels including side panels, which side panels are at least partly releasable.

\* \* \* \* \*